United States Patent [19]

Masegi et al.

[11] 4,198,154
[45] Apr. 15, 1980

[54] IMAGE RECORDING APPARATUS CAPABLE OF REPRESENTING HALF-TONES ON AN IMAGE

[75] Inventors: Koichi Masegi; Takashi Kitamura, both of Yokohama, Japan

[73] Assignee: Canon Kabushiki Kaisha, Tokyo, Japan

[21] Appl. No.: 922,314

[22] Filed: Jul. 6, 1978

Related U.S. Application Data

[63] Continuation of Ser. No. 734,244, Oct. 20, 1976, abandoned.

[30] Foreign Application Priority Data

Oct. 24, 1975 [JP]   Japan ................................. 50-128172

[51] Int. Cl.² ............................................ G03G 15/00
[52] U.S. Cl. ....................................... 355/5; 346/146; 365/118
[58] Field of Search ...... 340/173.2, 173 LM, 173 LS, 340/173 LT; 346/160; 355/2, 5, 7, 16

[56] References Cited

U.S. PATENT DOCUMENTS

| | | | |
|---|---|---|---|
| 3,358,081 | 12/1967 | Young et al. | 346/160 |
| 3,660,818 | 5/1972 | Amodei et al. | 355/5 X |
| 3,736,046 | 5/1973 | Zook | 340/173 LT X |
| 3,750,189 | 7/1973 | Fleischer | 346/160 |
| 3,898,627 | 8/1975 | Hooker et al. | 340/173 LT |

*Primary Examiner*—William M. Shoop
*Attorney, Agent, or Firm*—Fitzpatrick, Cella, Harper & Scinto

[57] ABSTRACT

This specification discloses a recording apparatus which is capable of representing half-tones of an image. The apparatus is provided with a device for varying the spot size of a recording beam on a recording medium in accordance with the density information of the image to be recorded in order that the half-tones of the image may be represented by the use of a screen dot system. This device causes aberration to the optical system used therein, to thereby vary the size of the beam spot impinging on the recording medium and if required adjust the quantity of light of the beam to create spots of different diameters. Thus, without relatively increasing the power of the beam, it is possible to provide beam spots of various diameters to thereby enable representation of a half-toned image.

29 Claims, 20 Drawing Figures

IMAGE RECORDING APPARATUS CAPABLE OF REPRESENTING HALF-TONES ON AN IMAGE

This is a continuation of application Ser. No. 734,244 filed Oct. 20, 1976, now abandoned.

BACKGROUND OF THE INVENTION

1. Field of the Invention

This invention relates to an image recording apparatus for representing half-tones of an image, and more particularly to a half-tone recording apparatus of the beam scanning type in which a beam of light, electron or the like is modulated and deflected by recording information and scans a recording medium to thereby record information on the recording medium, and in which at least the expanse of the recording beam is increased or decreased in accordance with the density information of the image and if required, the intensity of the beam is also varied, to thereby enable half-tones of the image to be represented.

2. Description of the Prior Art

In the art of photography using a recording material such as silver salt or the like to represent the tones of an image, continuous tone representation is possible, whereas depending on the type of the recording material, the exposure vs. density characteristic curve, which is representative of the variation in density for the variation in exposure, has a narrow linear range and the use of such a recording material results in a disadvantage that the resultant image representation lacks half-tones of the image, thus being inferior in quality, because the density of the material cannot linearly follow the variation in density of the image. In order to overcome this, recording may be effected with the exposure simply increased or decreased but this is not sufficient to represent the delicate half-tones of the image.

Recording materials used in the electronic or the electrostatic photography may be mentioned as such recording material. Copying machines using such recording materials are commercially available but, when half-tones are to be represented by these machines, it is well-known that the use of an image original in the form of screen dots is the most effective. This is not restricted to copying machines, but in the ordinary field of printing, half-tone representation is accomplished by using the screen dot system when photographs or the like having continuous tones are to be printed.

SUMMARY OF THE INVENTION

It is an object of the present invention to provide, in a scanning type recording or display apparatus using a beam of light or electron, an improved recording apparatus which adopts the screen dot system and can effect representation of half-tones.

It is another object of the present invention to provide, in an apparatus for effecting beam scanning and recording by using a recording medium whose exposure vs. density characteristic curve has a narrow linear range peculiar to the recording materials for electronic or electrostatic photography or which is treated so as to present such a characteristic, an apparatus in which the expanse of the beam impinging on the recording medium may be controlled to form screen dots and thereby represent half-tones.

It is still another object of the present invention to provide a half-tone recording apparatus which realizes the formation of screen dots by a combination of the steps of introducing aberration into the beam in accordance with the intensity signal of the image to be recorded and adjusting the quantity of light impinging on the recording or display medium.

It is yet still another object of the present invention to provide a half-tone recording apparatus which uses a telescope type optical system comprising two or more lens groups to control the expanse of the beam impinging on the recording or display medium in accordance with the intensity signal of the image and in which an element for varying the length of optical path by said signal is disposed between said lens groups to introduce aberration into the beam.

It is a further object of the present invention to provide a half-tone recording apparatus which uses an element utilizing the electro-optic effect to cause aberration to the beam in accordance with the intensity signal of the image to be recorded.

It is a further object of the present invention to provide a half-tone recording apparatus which uses an element utilizing the acousto-optic effect to cause aberration to the beam in accordance with the intensity signal of the image to be recorded.

It is a further object of the present invention to provide an image recording apparatus in which the diameter of the beam impinging on the recording medium is varied by utilization of spherical aberration to thereby represent or record the half-tones of the image.

Other objects and features of the present invention will become fully apparent from the following detailed description of the invention taken in conjunction with the accompanying drawings.

DESCRIPTION OF THE PREFERRED EMBODIMENTS

By taking a laser beam as an example of the beam, description will hereinafter be made of an apparatus using such beam to scan an electrophotographic recording material, and particularly with respect to some embodiments of the present invention which use screen dots to represent half-tones of an image original.

By reference to FIG. 1 which is a perspective view schematically showing an embodiment of the recording apparatus according to the present invention, the outline of the apparatus of the present invention will first be described.

Figure 1:
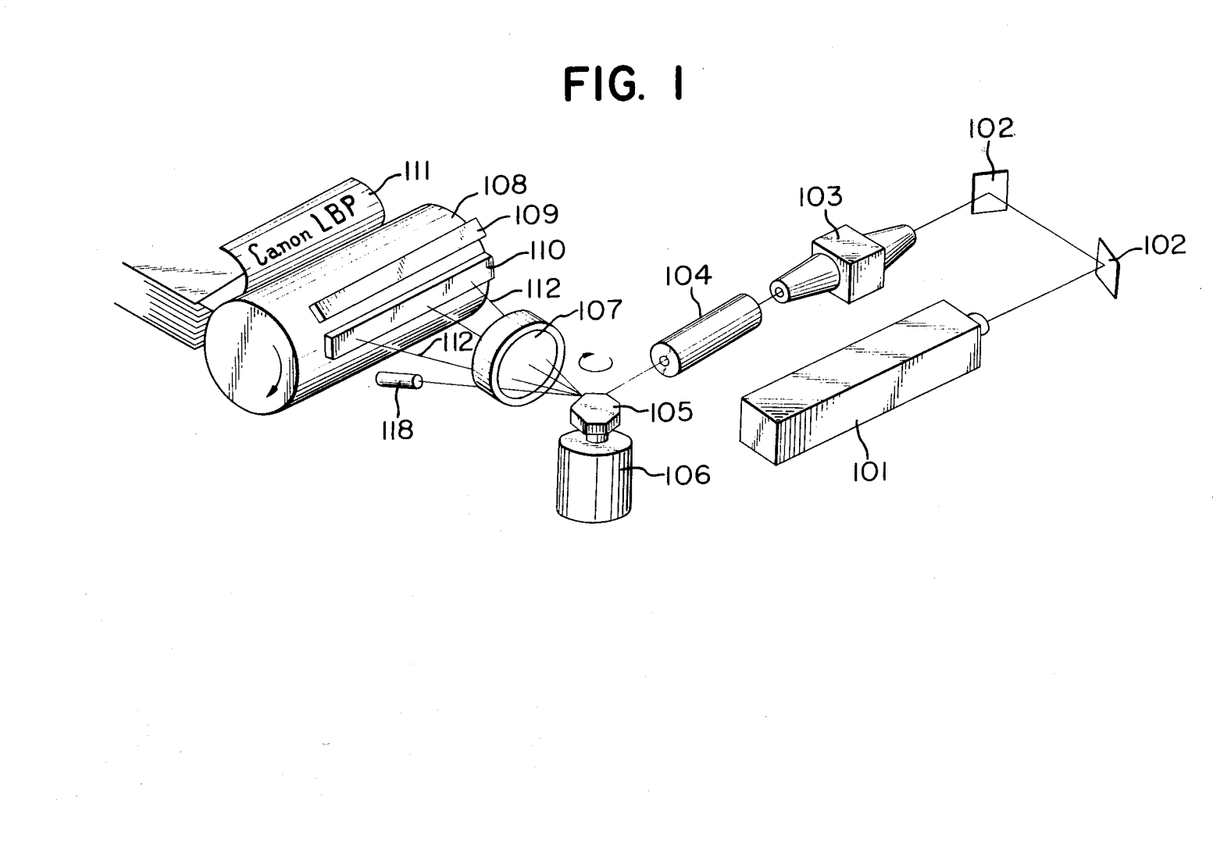
FIG. 1 is a perspective view schematically showing the image recording apparatus according to the present invention.

In FIG. 1, the laser beam oscillated from a laser oscillator 101 is directed via a mirror 102 to the input opening of a modulator 103. A mirror 102, which is inserted to bend the light path to reduce the space occupied by the apparatus, may be eliminated if it is unnecessary.

The modulator 103 may be a well-known acousto-optic modulation element utilizing the acousto-optic effect or a well-known electro-optic element utilizing the electro-optic effect.

In the modulator 103, the laser beam is modulated intensely or weakly in accordance with the input signal to the modulator. If the laser oscillator 101 uses a semiconductor laser or even a gas laser or like laser of the type which is capable of current modulation or an internal modulation laser of the type which incorporates a modulation element in the path of oscillated beam, the modulator 103 may be eliminated and the laser beam may be directly passed to a spot size control device 104. The laser beam from the modulator 103 is controlled by the spot size control device 104 so that the spot size on a recording medium may be determined. The spot size control device 104, as will further be described, has functions such as the functions of imparting aberration in accordance with the intensity signal of the image and bringing part of the beam partly out of phase, and controls the size of the beam spot on the recording medium. Taking an example for a better understanding, the spot size control device 104 may be realized by using what is called a beam expander for expanding the diameter of a parallel beam.

Figure 2A:
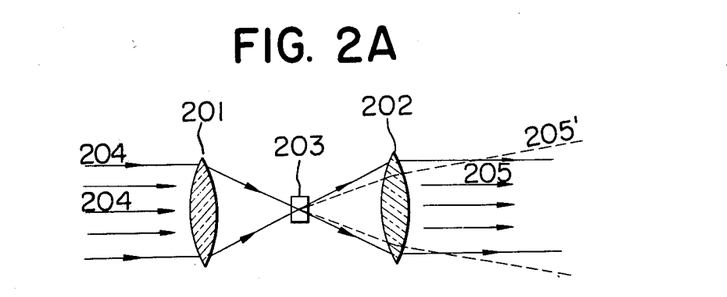
FIG. 2(A) illustrates an embodiment of the beam expander as the beam spot size control device applicable in the present invention.

In the case of a telescope type beam expander as shown in FIG. 2(A), optial crystal 203 such as KDP (KH$_2$PO$_4$) or ADP (NH$_4$H$_2$PO$_4$) whose refractive index is variable by electric field is disposed just adjacent to the focal plane of the input side lens group 201 with the optical axes aligned so that when there is no electric field applied, the focus of the output side lens group 202 lies at the focus of the input side lens group 201. Thus, when there is no electric field applied to the optical crystal 203 and if the incident beam 204 is of plane wave, the optical crystal acts as a usual beam expander to provide an emergent beam of plane wave 205 as indicated by solid lines. On the other hand, when there is an electric field applied to the optical crystal 203, the length of light path in the crystal 203 is varied so that the focal plane of the input lens group 201 and the focal plane of the output lens group 202 come out of coincidence. This is shown in detail in FIG. 2(B). As the result, when a plane wave enters as the incident beam 204, the emergent beam 205' becomes a spherical wave as indicated by broken lines. That is, the emergent beam assumes a wave front having aberration imparted thereto, instead of a plane wave.

The emergent beam 205, which provides the output beam of the spot size control device 104 (see FIG. 1), further passes to a subsequent optical system and, if the subsequent optical system is designed such that when a plane wave comes there the spot on the recording medium assumes its minimum diameter, a spherical wave will be an input when there is an electric field applied to the optical crystal 203, so that a so-called halo will be provided on the surface of the recording medium, which means an increased diameter of the beam. In this manner, the beam diameter on the recording medium can be controlled by the amount of variation in the length of light path within the crystal 203, namely, the intensity of the electric field applied to the crystal.

An embodiment of the present invention has been described hitherto, and the spot size control device itself will later be described in greater detail, but in the present embodiment, the subsequent optical system will still be described with respect to an example which uses this spot size control device 104 of the beam expander type.

The output laser beam from the spot size control device 104 impinges on a polygonal rotatable mirror 105 having one or more mirrored surfaces, as shown in FIG. 1. Of course, such polygonal rotatable mirror may be replaced by well-known scanning means such as galvano-mirror or the like. The polygonal rotatable mirror 105 is mounted on a shaft supported by means of high precision bearing (such as pneumatic bearing), and driven from a constant speed motor 106 (such as hysteresis synchronous motor or DC servomotor). The laser beam 112 horizontally swept by the polygonal rotatable mirror 105 is focused as a spot on a photosensitive drum 108 by a focusing lens 107 having f-$\theta$ characteristic. In common focusing lenses, the position f at which the image is formed on the image plane when the angle of incidence of light is $\theta$ is in the relation:

$$r = f \cdot \tan \theta \qquad (1)$$

where f is the focal length of the focusing lens. Thus, the laser beam 112 reflected by the predetermined polygonal rotatable mirror 105 as in the present embodiment has its angle of incidence on the focusing lens 107 varied with time in the fashion of linear function. Therefore, the velocity of movement of the spot formed on the photosensitive drum 108 which is the image plane is non-linearly varied and not constant. In other words, the velocity of movement of the spot is increased at the point whereat the angle of incidence is increased. Thus, if the laser beam is turned on at a predetermined time interval so that a train of spots is formed on the photosensitive drum 108, the space interval between these spots will be greater at the opposite ends of the train than at the central portion. To avoid such phenomenon, the focusing lens 107 is designed to provide a characteristic as represented by:

$$r = f \cdot \theta \qquad (2)$$

Such a focusing lens 107 will hereinafter be referred to as the f-$\theta$ lens. Further, when a parallel beam is focused as a spot by a focusing lens, the minimum spot diameter dmin is given as:

$$d\text{min} = f(\epsilon \lambda / A) \qquad (3),$$

where f is the focal length of the focusing lens, λ the wavelength of the light used, and A the entrance aperture of the focusing lens (if the beam diameter is smaller than the aperture, A is the expanse of the beam). However, it is to be noted that $\epsilon$ is a constant approximate to unity (1) and for example, $\epsilon = 1.27$ for a laser beam having a diameter smaller than the entrance aperture. Where f and λ are constant, a smaller spot diameter $d_{min}$ may be provided by increasing the A. The aforementioned beam expander 104 is used to impart such an effect.

In the foregoing, discussion has been made about the case where a wave front free of aberration is incident on the f-θ lens. When a wave front having some aberration is incident on the f-θ lens, the beam diameter on the recording medium will be:

$$d_{min} = (8f/KA)\sqrt{1 + K^2\sigma^2 A^4} \quad (4),$$

where K is the wave number of the light, f the focal length of the f-θ lens, A the expanse of the laser beam and σ the aberration coefficient of the beam expander to be described. When the aberration coefficient to be described is zero, equation (4) is in accord with equation (3), provided that $\epsilon = 4/\pi$. A beam detector 118 is provided which comprises a small entrance slit and a quickly responsive photoelectric conversion element (for example, PIN diode). The beam detector 118 detects the position of the swept laser beam 112 and the detector signal thereof determines the timing for starting the input signal to the modulator 103 to impart desired light information onto the photosensitive drum. By this, the error in the division accuracy of each reflecting surface of the polygonal rotatable mirror 105 and the mis-synchronism of the signals in the horizontal direction resulting from the irregularity of the rotation of the rotatable mirror may be greatly reduced to ensure good quality of image formation and the allowance of accuracy required of the polygonal rotatable mirror 105 and drive motor 106 may be increased to permit a lower cost of manufacture.

The laser beam 112 deflected, modulated and defocus-controlled by the spot size control device 104 is thrown upon the photosensitive drum 108 to form a latent image thereon, which is developed into a visible image by the electrophotographic process, and then transferred and fixed onto plane paper, and finally put out as a hard copy.

A recording section 110 will now be described by reference to FIG. 3, as well.

An example of the electrophotographic process which is applicable to the present embodiment is disclosed in U.S. Pat. No. 3,666,363 or other, wherein the insulating layer of the photosensitive drum 108 basically comprising an electrically conductive back-up member, a photoconductive layer and an insulating layer is uniformly pre-charged to the positive or the negative polarity by a first corona charger 109, charge opposite in polarity to said pre-charge is captured in the interface between the photoconductive and the insulating layer or within the photoconductive layer, whereafter said laser beam 112 is applied to the charged insulating layer surface while AC corona discharge is applied to the same surface by an AC corona charger 110 so that a pattern resulting from the surface potential difference provided in accordance with the light-and-dark pattern of the laser beam 12 is formed on the insulating surface layer, and then the entire surface of the insulating layer is uniformly exposed to light to thereby form an electrostatic latent image with high contrast on the insulating surface layer, which electrostatic image is further developed into a visible image by a developing device 113 with the aid of developer composed chiefly of charged toner particles, whereafter the visible image is transferred to a transfer medium such as paper or the like by utilization of internal or external field, and subsequently the transfer image is fixed by fixing means 115 comprising an infrared ray lamp or heated plate, thereby providing an electrophotographically printed image. On the other hand, after the image transfer, the insulating layer surface is cleaned by a cleaning device 116 to remove any residual charged particles therefrom, whereby the photosensitive drum becomes ready for reuse.

Figure 3:
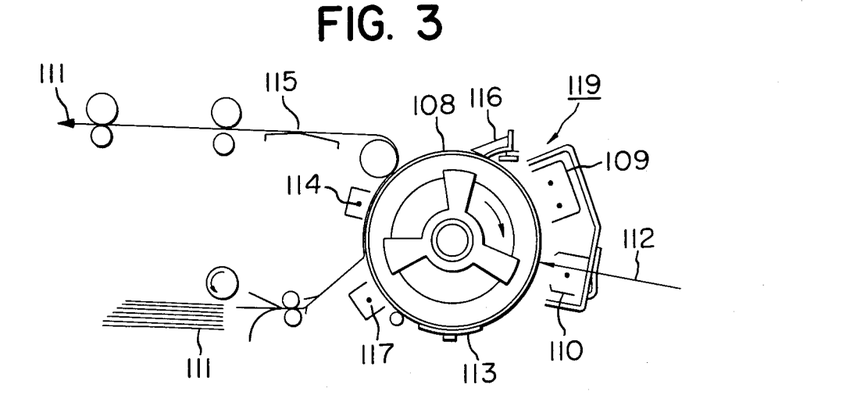
FIG. 3 is a front view schematically showing the printer section applicable in the present invention.

In FIG. 3, reference numeral 114 designates an image transfer corona discharger and 117 a post-corona discharger for squeezing the developing liquid if the developer is in liquidous form. In FIGS. 1 and 3, similar numerals designate similar members.

Where an AC corona discharger is employed in the above-described electrophotographic process, the frequency $f_O$ of the AC voltage should preferably in a relation with the peripheral velocity V of the photosensitive drum that $f_O \gtrsim V/P$, where P is a constant determined by such factors as the electrostatic capacity of the photosensitive medium, the width of the AC discharge area, and the conditions of the development.

As another available example of the electrophotographic process, it is possible to impart AC corona discharge to the insulating layer surface after the primary charging step to thereby attenuate the charge on the insulating layer surface, and then apply the laser beam as information signal to the insulating layer surface to form thereon an electrostatic image corresponding to the light-and-dark pattern of the laser beam, and thereafter carry out the developing step and subsequent step in the same manner as already described.

In either of the above-described process, the secondary step may use, instead of the AC discharge, a second corona discharge opposite in polarity to the charge used in the primary step and the other steps may be similar to those described above.

In the above-described example of the laser beam scanning type recording system, a method of representing half-tones by varying the beam diameter on the recording medium with the aid of the spot size control device will hereinafter be discussed in detail.

Figure 4:
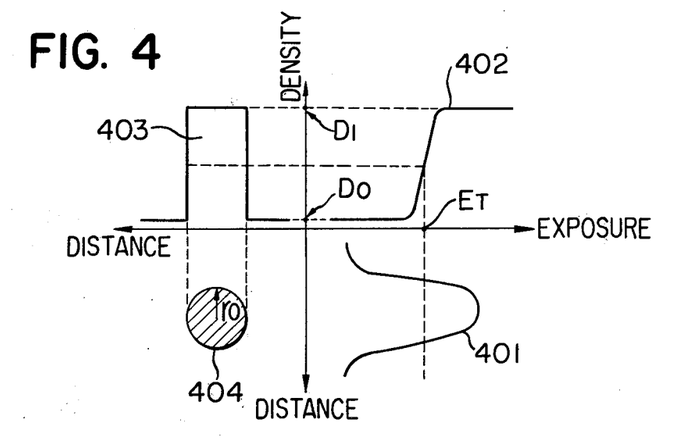
FIG. 4 is a graph illustrating the relation between the exposure and the image density on a recording medium used, as well as the relations between the exposure and the space and between the image density and the space.

The laser beam focused on the recording medium provides a density distribution on the photosensitive medium in accordance with the exposure vs. density characteristic curve of the recording medium. FIG. 4 illustrates the transformation of the laser beam into the density distribution caused by the recording medium whose exposure vs. density characteristic curve has a narrow linear range in which the variation in density for the variation in exposure is linear or the recording medium which is treated so as to present such a characteristic. Designated by 402 is the exposure vs. density characteristic curve. The laser beam focused on the recording medium approximately presents Gaussian distribution 401 and this is transformed into a circle 404 of radius $r_O$ having a density $D_1$. Although the linear range in the exposure vs. density characteristic curve of the recording medium is narrow, the recording medium has some linear range at any rate, and thus the circumferential area of the circle 404 of radius $r_O$ has an intermediate density between $D_O$ and $D_1$. Discussion will mathematically be made in a little greater detail.

The energy of the laser beam on the recording medium can be approximated to the Gaussian distribution, namely, to the following equation:

$$I(x,y) = \frac{2 I_{tot}}{\pi w_s^2} e^{-\frac{2(x^2 + y^2)}{w_s^2}} \tag{5}$$

where $I_{tot}$ represents the total energy and $w_s$ the expanse of the beam. Assuming that the density of the recording medium changes from $D_O$ to $D_1$ before and after the exposure $E_T$, the diameter of the circle 404 having the density $D_1$ will be:

$$2r_0 = 2\sqrt{\frac{w_s^2}{2} \log \frac{2 I_{tot} \cdot T}{\pi w_s^2 E_T}}, \tag{6}$$

where T is exposure time.

Therefore, the diameter of the circle having the density $D_1$ may be increased or decreased by taking into account the beam diameter $w_s$ of the laser beam, the total energy $I_{tot}$ thereof and the exposure time. By utilizing this, representation of half-tones of an image will now be discussed.

Consider a certain minute region (of which the area is B and the density is $D_O$) and prepare therewith a region of density $D_1$ (whose area is C). The average density of this minute region will be:

$$\frac{D_1 C + (B - C)D_0}{B} \tag{7}$$

Figure 5:
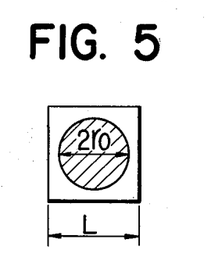
FIG. 5 is a view illustrating a minute region of the image in the form of a square and the region of density $D_1$ in the form of a circle.

If $D_O = 0$, this will become $D_1 C/B$. For example, if the minute region is a square and the region of density $D_1$ is a circle, as shown in FIG. 5, then the average density will be given as:

$(r_0^2 \cdot D_1/L^2)$ $(2r_0 \leq L)$ \hfill (8)

Figure 6:
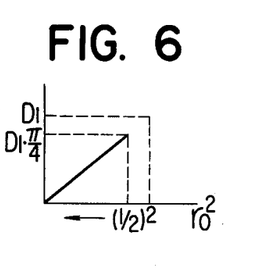
FIG. 6 is a graph of $r_0^2$ vs. average density, where $r_0$ is the radius of the circular region of density $D_1$.

If so, $r_0^2$ vs. average density will be as shown in FIG. 6, where the maximum density is not $D_1$ but $\pi/4 D_1$. In order that the maximum density may be $D_1$, an optical system for transforming the shape of the beam into a square, for example, a cylindrical lens, may be used on the midway of the light path.

The ensuing discussion will be made of a system which does not use such an optical system, but similar discussion may be made in the converse case.

From expression (8) above, it follows that half-tones can be represented by varying the $r_O$.

A specific example of the method for varying the $r_O$ will shown below.

Figure 2B:
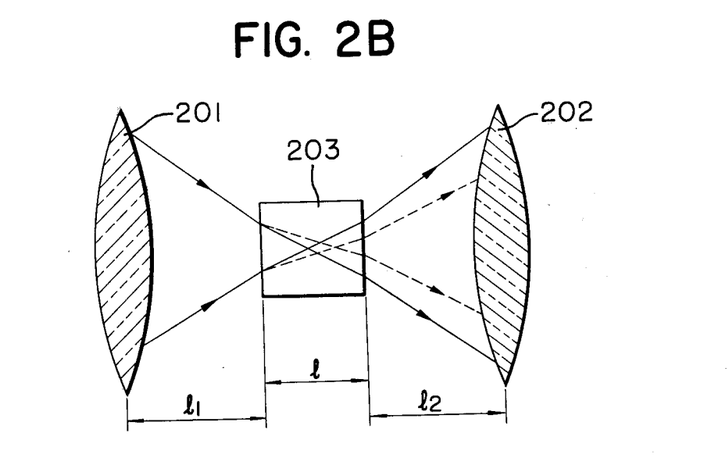
FIG. 2(B) is an enlarged view of a portion thereof.

For example, in the beam expander of the type as shown in FIGS. 2(A) and 2(B), an electro-optic element such as KDP or ADP having a thickness 1 is placed in the vicinity of the common focus of the first 201 and the second lens group 202 between these lens groups. The optical distance between the lens groups 201 and 202 is: $l_1 + l_2 + n(E)l = f_1 + f_2 + \Delta(E)$, where n(E) indicates that the refractive index of the crystal is varied by applied voltage E (electro-optic effect).

When a laser beam (which can be approximately provided by a Gaussian beam) as represented by $$e^{-\frac{r^2}{w_s^2} + \frac{K \cdot r^2}{2R}}$$

is incident on such an optical system, the emergent laser beam is proportional to $$e^{-\frac{r^2}{w_s'^2} + i\frac{K \cdot r^2}{2R'} + iK\sigma r^2}.$$

where $w_s' = M w_s$ $M = \frac{\bar{f} + \Delta}{f}$
$R' = M^2 R$
$\sigma = \frac{\Delta}{2f(f + \Delta)} \approx \frac{\Delta}{2F}$ Thus, the emergent laser beam has an aberration term $K\sigma r^2$. When this beam is caused to enter the aforementioned f-$\theta$ lens, the beam diameter will be expanded as compared with the case where there is no aberration. The amount of expansion has already been described in connection with the f-$\theta$ lens.

By so controlling the voltage applied to the electro-optic element contained within the beam expander 104, it is possible to impart a variable aberration to the emergent beam from the expander, thereby varying the diameter of the beam focused on the recording medium. At that time, the peak power of the beam is decreased by the increase of the beam diameter and therefore, the modulation level of the modulator 103 must be varied so as to increase the peak power.

Figure 7:
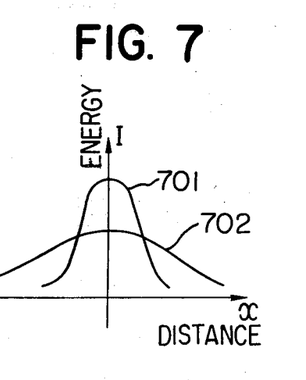
FIGS. 7 and 8 illustrate energy distributions of the beam on the recording medium.
Figure 8:
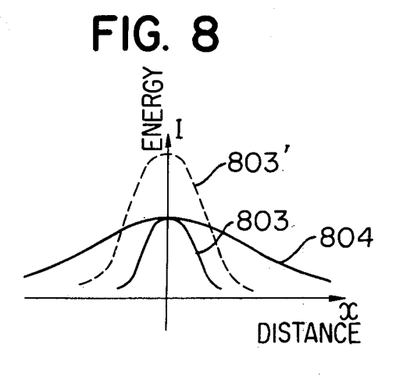

FIG. 7 illustrates the energy distribution of the beam on the recording medium. It is seen that the peak value drops due to the beam diameter being expanded as from distribution 701 to distribution 702. FIG. 8 shows an example in which, when there is a narrowed beam distribution 803, the peak value is lowered to provide a distribution 803 which has the same peak value as a distribution 804. In this case, it is to be understood that the photosensitive medium is sufficiently saturated at the distribution 804 so that a necessary maximum spot diameter is provided. This means, for example that 2 $I_{tot}/\pi w_s$ is made constant in equation (5) which represents the energy distribution of the laser beam. Since the beam diameter on the recording medium is given by equation (4), the $w_s$ in equation (5) is:

$$2w_s = (8f/KA)\sqrt{1 + K^2\sigma^2 A^4} \tag{9}$$

Consequently, the average density is given by the use of expressions (6) and (8), as follows:

$$\pi D/L^2 (8f/KA)^2 (1 + K^2\pi^2 A^4) \cdot \log(2I_{tot} \cdot T)/\pi w_s^2 E_T \tag{10}$$

If the peak power of the laser beam is made constant, the density will be proportional to:

$$(8f/KA)^2 (1 + K^2\sigma^2 A^4) = d^2\text{min}$$

This equation shows that density is varied by imparting aberration.

Figure 9:
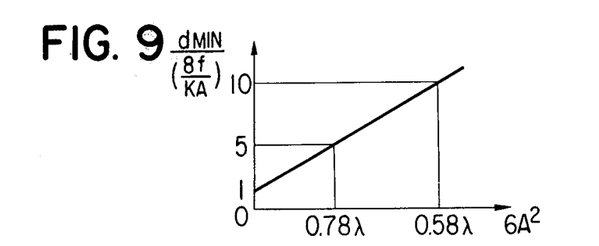
FIG. 9 is a graph illustrating the variation in minimum beam diameter for aberration.

FIG. 9 shows the variation in beam diameter dmin for aberration $\sigma A^2$. In this graph, f is the focal length of the f-$\theta$ lens, $\lambda$ the wavelength used, K the wave number used, A the beam diameter of the beam incident on the f-$\theta$ lens, and $\sigma$ the aberration coefficient. From equation (10) and FIG. 9, it is seen that the beam diameter dmin is varied simply by imparting slight aberration. This in turn means that the density can be greatly varied by imparting slight aberration. This shows that the method now under discussion is more effective to increase or decrease the diameter of the circle having the density $D_1$, than the method which only comprises varying the total energy of the laser beam. This is simply attributable to whichever term the density in equation (10) representative of density is proportional to, the term $d^2min$ relating to the beam diameter or the term $\log (I_{tot} \cdot T)/2\pi d^2 min E_T$ relating to the total energy $I_{tot}$ of the laser beam. If the intensity $I_{tot}$ alone is varied, the beam diameter having the density $D_1$ will be varied only logarithmically and the rate of variation will be poor, with a result that a wide dynamic range of the density cannot be secured. Therefore, the present invention provides a method or recording with a wide dynamic range of density secured by varying the aberration coefficient $\sigma$ to vary the beam diameter $d^2min$ and, if required, also varying the $I_{tot}$ to enable recording of an image.

As an example of the spot size control device, description has hitherto been made of a method of imparting spherical aberration, particularly a method of achieving this by incorporating an electro-optic element in the telescope type optical system, whereas the spot size control method is not restricted to such a method but the spot size may of course be controlled as by a method which comprises by imparting a phase difference to part of the laser beam to partly create aberration therein and thereby control the spot size.

Further examples of the spot size control method are shown in FIG. 10. The method shown in FIGS. 10(A) and 10(B) is of the type in which a substance 1004 having the electro-optic effect is disposed in the light path to impart partial aberration to the beam. Substances having the electro-optic effect include liquids having the Kerr effect such as nitrobenzene or carbon bisulfide and the substances having the Pockels effect such as KDP ($KH_2PO_4$), ADP ($NH_4H_2PO_4$), $LiNbO_3$, $LiTaO_3$ or the like, and any of these substances may be used in the present invention. If KDP is employed as the substance 1004, the arrangement as shown in FIGS. 10(A) and 10(B) will be adopted to reduce the voltage applied to the KDP crystal.

A plane wave 1001 is subjected to one-way compression by cylindrical lenses 1002 and 1003 and enters the KDP 1004 as a beam having a rectangular cross-sectional shape 1001'. As shown in FIG. 10(B), electrodes 1005 are disposed on the KDP 1004 so as to impart an irregular electric field across the beam. When there is no voltage applied to the KDP 1004, the plane wave having entered through one end surface of the KDP 1004 polished with good planarity emerges from the other end surface without forming any aberration, whereafter it is again formed into a plane wave by cylindrical lenses 1006 and 1007. However, when a voltage is applied to the electrodes 1005, the irregularity of these electrodes causes irregularity of refractive index to be created in the KDP crystal 1004, whereby there is provided an effect similar to creation of the so-called striae. By this, phase difference is introduced into the wave front of the beam having entered the KDP and thus, the beam emergent from the cylindrical lenses 1006 and 1007 becomes a wave front having aberration, instead of a plane wave. After that, as in the telescope type optical system, the wave front having aberration has its beam expanded by a subsequent optical system and forms a large spot on the recording medium.

Figure 10A:
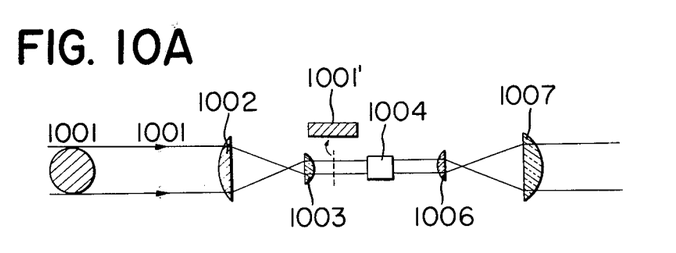
FIGS. 10(A) to 10(E) show three other examples of the spot size control method, FIGS. 10(A) and 10(B) being a front view and a plan view, respectively, of a fist example, FIGS. 10(C) and 10(D) being similar views of a second example, and FIG. 10(E) being a front view of a third example.
Figure 10B:
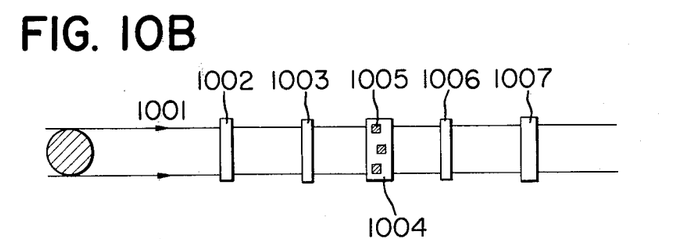
Figure 10C:
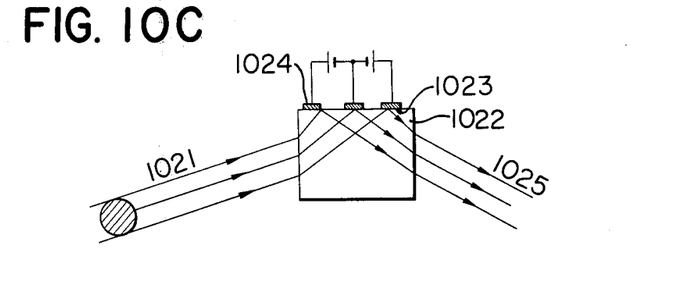
Figure 10D:
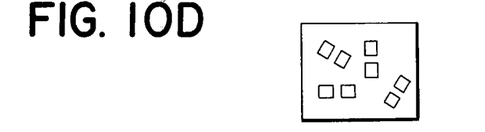

In contrast with the transmission type shown in FIG. 10(A), another example is a method which is of the reflection type but can obtain the same effect as the transmission type. This is shown in FIGS. 10(C) and 10(D).

This alternative example is similar to the example shown in FIGS. 10(A) and 10(B) with the only exception that it is of the transmission type. The incident beam 1021 has its angle of incidence set so that it is totally reflected by that surface 1023 of KDP 1022 having electrodes 1024 attached thereto. The electrodes 1024 are irregularly arrayed on the surface 1023 of the KDP 1022 and when there is no voltage applied thereto, the refractive index in the crystal is uniform so that the incident beam 1021 emerges as an output beam 1025 which keeps its wave front undisturbed. However, when a voltage is applied to the electrodes 1024, the refractive index in the crystal at the position between the positive and the negative electrode is varied by electric field so that the wave front is disturbed in the plane of total reflection. Thus, the output beam 1025 has its front wave disturbed and is no longer a plane wave, so that once passed through a subsequent optical system, it will form a widely expanded spot on the photosensitive medium. In both of the foregoing two examples, the amount of disturbance of the wave front is a function of the variation in partial refractive index, and since the variation in refractive index is a function of the applied voltage, it is possible to primarily correlate the applied voltage and the spot size on the photosensitive medium and control the latter by contriving the shape and arrangement of the electrodes.

Figure 10E:
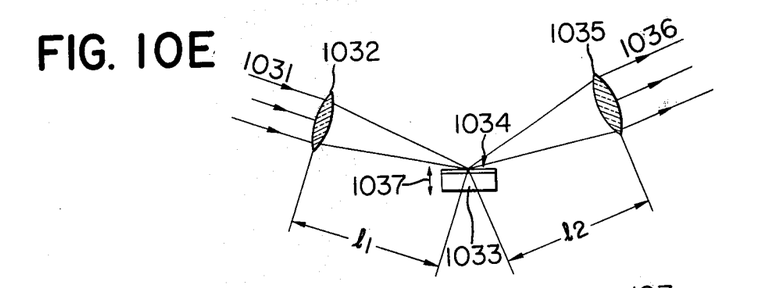

FIG. 10(E) shows a further example of the spot size control method. This is a method in which the reflection type control is carried out by the use of the telescope type optical system shown in FIGS. 2(A) and 2(B). The incident beam 1031 is passed through an input optical system 1032 to be focused in the vicinity of a reflecting surface 1034 provided on top of an electrically deformable element 1033. The reflected beam is transformed into a plane wave by an output optical system 1033 and provides an output beam 1036. For this purpose, the distance $l_1 + l_2$ between the input optical system 1032 and the output optical system 1035 is initially set so as to be equal to the sum of the focal lengths of the two optical systems, i.e. $F_1 + F_2$.

Upon application of a voltage to the electrically deformable element 1033, the electrically deformable element is deformed in the direction of arrow 1037 in accordance with the voltage applied (the amount of deformation on the light path is $\Delta l$), so that the optical path is varied to $l_1 + l_2 + \Delta l$. By this, the emergent beam from the output lens 1035 is caused to be an uncollimated beam having aberration imparted thereto, in the same manner as described in connection with FIGS. 2(A) and 2(B). Again in this method, the amount of aberration is a function of $\Delta l$ and, since $\Delta l$ is a function of the applied voltage, the degree of aberration can be controlled by varying the applied voltage. Thus, the spot size on the photosensitive medium can be controlled by the applied voltage.

Still a further example of the spot size control method will be described by reference to FIGS. 11(A) and 11(B). This example is similar to the previous example in that the spot size is increased by utilization of aberration, but differs in that an element having the acousto-optic effect is used as the element having a variable refractive index.

Figure 11A:
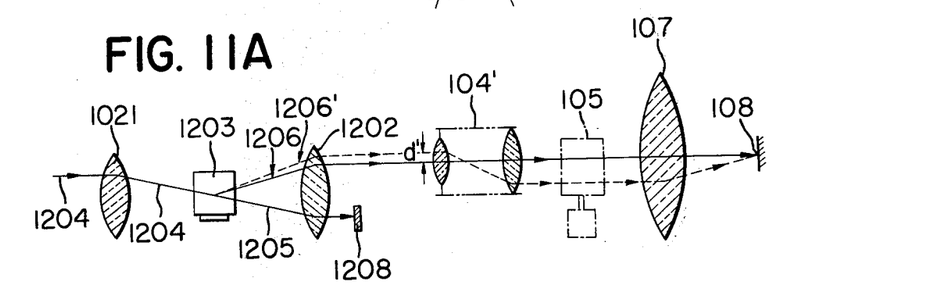
FIG. 11(A) illustrates still another example of the spot size control.
Figures 11B, 11C:
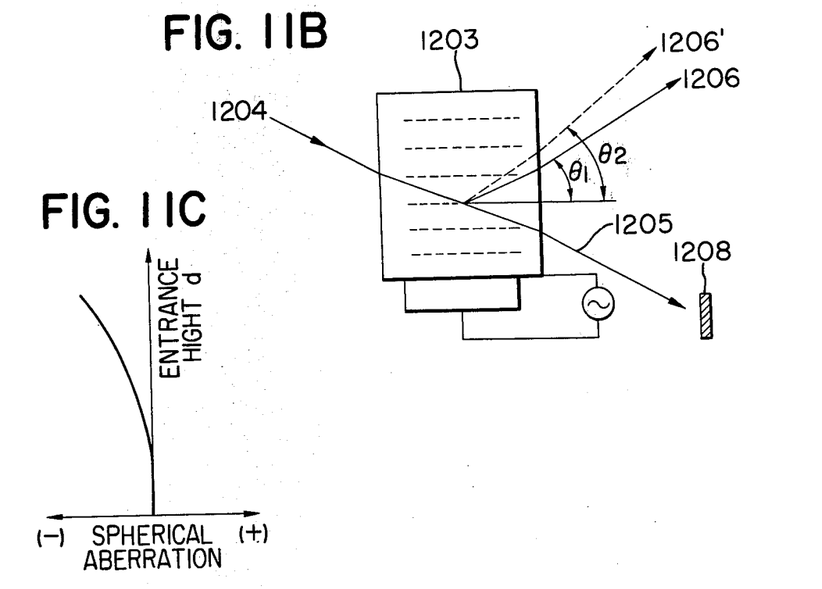
FIG. 11(B) is an enlarged view of a portion thereof.
FIG. 11(C) is a graph illustrating the characteristic of spherical aberration for the entrance height from the optical axis of the incident beam.

FIG. 11(A) shows the details of the optical device including such an element and FIG. 11(B) shows the acousto-optic effect element on an enlarged scale. An acousto-optic effect element 1203 is disposed just adjacent to the focal plane of an input lens group 1201 (shown as a single lens). When a standard ultrasonic wave having a predetermined frequency is propagated through this element, a primary beam 1206 is reflected at a Bragg angle of $2\theta_1$ with respect to a zero-degree beam 1205. The Bragg angle $\theta_B$ is generally expressed as:

$$\theta_B = \sin^{-1}(\lambda/\Lambda) = \sin^{-1}(\lambda/v) \cdot f_B,$$

where $\lambda$ is the wavelength of the light, $\Lambda$ the wavelength of the ultrasonic wave, v the velocity of the ultrasonic wave and $f_B$ the frequency of the ultrasonic wave.

The output lens group 1202 is disposed with its optical axes aligned so that the focus of the output lens group lies at the position of the focus of the input lens group 1201 with respect to the primary beam when the standard ultrasonic wave is propagated through the element 1203.

Thus, when the standard ultrasonic wave is being propagated through the element 1203, the zero-degree beam 1205 is intercepted by a shield plate 1208 while the primary beam 1206 alone is passed through the output lens 1202 in collimated state and emerges as a plane wave, thus causing no spherical aberration. Subsequently, the beam in its collimated state is directed to the input aperture of the beam expander 104' and passes through the center thereof for expansion of the beam diameter, whereafter the beam passes through the scanner 105 and f-$\theta$ lens 107 to the photosensitive medium 108. The optical axes of the respective elements are set so as to realize this.

If an ultrasonic wave different from the standard ultrasonic wave, for example, an ultrasonic wave having a greater frequency than that of the standard ultrasonic wave is propagated through the acousto-optic effect element 1203, the primary beam 1206' thereof is reflected at a greater Bragg angle $\theta_2$ as indicated by broken line 1206'. This beam passes through the output lens 1202 to provide a beam which is parallel to but distant by d from the optical axis, as seen in FIG. 11(A). When such a beam distant by d from the optical axis enters the beam expander 104', the lenses forming the beam expander create spherical aberration in accordance with the entrance height d. This relation is illustrated in FIG. 11(C). In the graph of FIG. 11(C), it is seen that in accordance with the Bragg angle $\theta_B$, the entrance height from the optical axis of the beam entering the optical system subsequent to the beam expander is varied and the amount of spherical aberration is also varied, so that the amount of spherical aberration and accordingly the beam spot diameter on the recording medium can be controlled by varying the Bragg angle or the frequency of the ultrasonic wave entering the element 1203.

In the foregoing, the variation in Bragg angle has been described with respect to the beam entering the element 1203 at a certain angle, but with respect to a beam entering the element perpendicularly thereto, it is also known from the Raman-Nath diffraction phenomenon that the angle of emergence of such beam can be controlled by the frequency of the ultrasonic wave propagated through the element. In any of the examples shown above, the modulator 103 seen in FIG. 1 acts also as a deflector to thereby realize the intended effect.

Although some examples of the spot size control device have been described, the spot control is not restricted to the illustrated specific methods but other various methods are available.

Figure 12A:
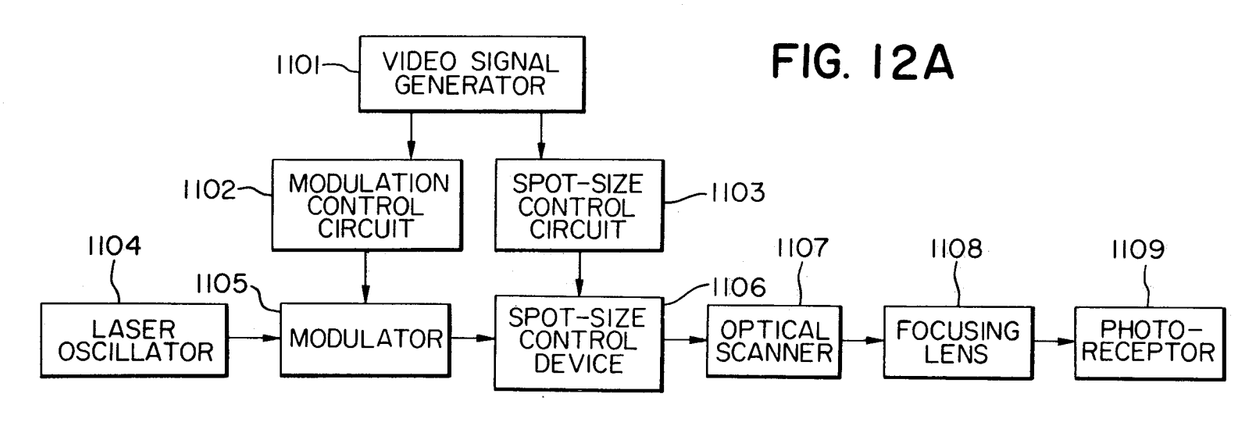
FIGS. 12(A) and 12(B) show the electrical signal system in block form for controlling the spot size.

Description will now be made of the electrical signal system for controlling the spot size control device shown above in various forms. FIG. 12(A) is a block diagram of the electrical signal system. Designated by 1101 is a video signal generator which may specifically be a device for supplying a printer unit with video signals equivalent to those from a camera using various image pick-up tubes, video disc, video tape, storage tube or the like, and such signals also include direct or indirect signals from a computer. The image intensity signal from the video signal generator 1101 is applied to a modulation control circuit 1102 and a spot size control circuit 1103. The modulation control circuit 1102 includes therein circuits such as a circuit for converting the input image intensity signal into a signal for driving a modulator 1105 and a $\gamma$-correcting circuit for maintaining the linearity of the image. Likewise, the spot size control circuit 1103 includes therein circuits such as a circuit for driving the spot size control device 1106 and a circuit for effecting $\gamma$-correction by the spot size.

The signal from the modulation control circuit 1102 is applied to the modulator 1105 to control the quantity of modulated light in accordance with the intensity of the image signal.

The signal from the spot size control circuit 1103 is applied to the spot size control device which is similar to the one previously indicated by 104, to control the amount of aberration of the output light from the spot size control device 1106 in accordance with the intensity of the image signal. On the other hand, the beam from the laser oscillator 1104 enters the modulator 1105 and subjected to modulation in accordance with the intensity of the video signal, and then further enters the spot size control device 1106. There, the beam is given aberration again in accordance with the intensity of the image signal, and thereafter enters a scanning optical system 1107. In the present embodiment, the scanning system 1107 is a polygon scanner. The beam from the polygon scanner 1107 passes through a focusing lens 1108 to be focused on a photosensitive drum 1109.

Figure 12B:
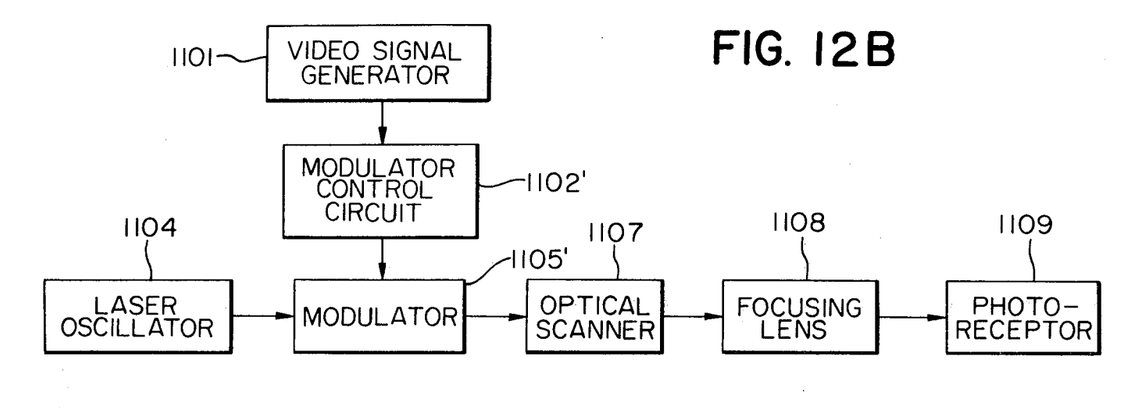

If use is made of the acousto-optic effect element shown in FIGS. 11(A) and 11(B) which also acts as the modulator 103 (see FIG. 1), the block diagram of FIG. 12(A) will be modified as shown in FIG. 12(B). More specifically, control is effected in the modulation control circuit 1102' so that modulation and deflection of the beam are carried out in the modulator 1105' by the signals from the video signal generator 1101 (information signal, i.e. amplitude modulation signal and intensity signal, i.e. ultrasonic wave frequency signal). By this deflection, the diameter of the beam spot is varied to create aberration, as already noted.

In order that a more minute spot size may be provided on the recording medium when no aberration is imparted, it is of course necessary to dispose a beam expander on the light path to thereby secure a large aperture.

As will be appreciated, the intensity modulation of the laser beam is effected as required in accordance with the image intensity signal while aberration is introduced into the wave front of the beam, whereby the size of the spot on the recording or display medium may be controlled to represent the half-tones of the image. The recording or display medium and the device for introducing aberration to control the spot size care not restricted to those examples shown and described herein.

What is claimed is:

1. An image recording apparatus capable of representing half-tones, comprising:
    a beam generator;
    a beam modulator;
    a recording medium sensitive to a beam;
    means for controlling the size of the beam spot impinging on said recording medium, said means including optical means for controlling the amount of aberration of the beam emerging therefrom;
    means for deflecting the beam subjected to modulation and spot size control and for causing the beam to scan over said recording medium;
    an optical system for focusing the scanning beam;
    a video signal generator for generating intensity signals and information signals of an image to be recorded; and
    means for driving said spot size control means, said means being responsive to said intensity signals to vary the diameter of the beam emerging from said spot size control means to form a beam for screen dot recording, thereby enabling the half-tones of the image to be represented by different beam diameters;
    wherein said optical means further includes a telescope type optical arrangement comprising at least two lens groups to control the expanse of the beam impinging on said recording medium in accordance with the intensity signals of the image to be recorded and an element disposed between said at least two lens groups for varying the length of the optical path in accordance with said intensity signals, said element being effective to impart aberration to the wave front of the beam.

2. An apparatus according to claim 1, wherein said beam generator includes a laser beam oscillator.

3. An apparatus according to claim 1, wherein said beam modulator includes a modulation element for the beam.

4. An apparatus according to claim 1, wherein said sensitive recording medium includes a sensitive member capable of retaining an electrostatic latent image thereon.

5. An apparatus according to claim 1, further comprising:
    means for forming an electrostatic latent image on said recording medium in response to the incidence of the beam thereon; and
    means for developing said electrostatic latent image.

6. An apparatus according to claim 1, wherein said element varying the length of optical path has an element utilizing the electro-optic effect.

7. An apparatus according to claim 1, wherein said optical means includes an electrically deformable element.

8. An apparatus according to claim 1, wherein said optical means includes an optical element for imparting spherical aberration to the emergent beam.

9. An image recording apparatus capable of representing half-tones comprising:
    a beam generator for producing a modulated beam;
    a recording medium sensitive to a beam;
    means for controlling the size of the beam spot impinging on said recording medium, said means including optical means for controlling the amount of aberration of the beam emerging therefrom;
    means for deflecting the modulated beam subjected to spot size control and for causing the beam to scan over said recording medium;
    an optical system for focusing the scanning beam;
    a video signal generator for generating intensity signals and information signals of an image to be recorded; and
    means for driving said spot size control means, said means being responsive to said intensity signals to vary the diameter of the beam emerging from said spot size control means to form a beam for screen dot recording, thereby enabling the half-tones of the image to be represented by different beam diameters;
    wherein said optical means further includes a telescope type optical arrangement comprising at least two lens groups to control the expanse of the beam impinging on said recording medium in accordance with the intensity signals of the image to be recorded and an element disposed between said at least two lens groups for varying the length of the optical path in accordance with said intensity signals, said element being effective to impart aberration to the wave front of the beam.

10. An apparatus according to claim 9, wherein said beam generator includes a laser beam oscillator.

11. An apparatus according to claim 9, wherein said beam modulator includes a modulation element for the beam.

12. An apparatus according to claim 9, wherein said sensitive recording medium includes a sensitive member capable of retaining an electrostatic latent image thereon.

13. An apparatus according to claim 9, further comprising:
    means for forming an electrostatic latent image on said recording medium in response to the incidence of the beam thereon; and
    means for developing said electrostatic latent image.

14. An apparatus according to claim 9, wherein said element varying the length of optical path has an element utilizing the electro-optic effect.

15. An apparatus according to claim 9, wherein said optical means includes an electrically deformable element.

16. An apparatus according to claim 9, wherein said optical means includes an optical element for imparting spherical aberration to the emergent beam.

17. An image recording apparatus capable of representing half-tones, comprising:
    a light beam generator;
    a light beam modulator;
    a recording medium sensitive to a light beam;
    means for imparting aberration to the wave front of the light beam to control the size of the beam spot on the recording surface of said recording medium, said aberration imparting means including an acousto-optic element;
    means for deflecting the beam subjected to modulation and spot size control and for causing the beam to scan over said recording medium;
    an optical system for focusing the scanning beam;

a video signal generator for generating intensity signals and information signals of an image to be recorded;

modulation control means responsive to said information signals to control the amount of modulation in said modulator; and means for driving said aberration imparting means, said means being responsive to said intensity signals to vary the diameter of the beam emergent from said aberration imparting means, to form a beam for screen dot recording, thereby enabling the half-tones of the image to be represented by different beam diameters.

18. In an apparatus for effecting beam scanning and recording by using a recording medium whose density variation characteristic curve for exposure has a narrow linear range or which is treated to provide such a characteristic, the improvement comprising:

means for controlling the expanse of the beam impinging on said recording medium to form screen dots having different beam spot diameters, whereby half-tones of an image to be recorded may be recorded, such means including optical means for causing aberration of the beam in accordance with the intensity signals of the image to be recorded by disturbing the wave front of the beam;

wherein said optical means for disturbing the wave front of the beam to thereby form screen dots includes a telescope type optical system comprising at least two lens groups and an optical element disposed between said lens groups for varying the length of the optical path in accordance with the intensity signals, said element being effective to cause aberration of the beam.

19. An apparatus according to claim 18, wherein said means for forming screen dots further includes:

means for adjusting the quantity of light of the beam impinging on said recording medium.

20. An apparatus according to claim 18, wherein said optical means for disturbing the wave front of said beam to thereby form screen dots includes an electro-optic effect element.

21. An apparatus according to claim 18, wherein said optical means for disturbing the wave front of said beam to thereby form screen dots includes an electrically deformable element.

22. In an apparatus for effecting beam scanning and recording by using a recording medium whose density variation characteristic curve for exposure has a narrow linear range or which is treated to provide such a characteristic, the improvement comprising:

an acousto-optical means for controlling the size of the beam spot impinging on said recording medium to form screen dots having variable diameters resulting from aberration, whereby half-tones of an image to be recorded may be obtained.

23. An image recording apparatus capable of representing half-tones, comprising:

modulated beam forming means for forming a beam modulated in accordance with an image information signal;

a recording medium sensitive to the beam;

means for scanning said modulated beam over said recording medium;

an optical system for focusing the scanning beam;

means for controlling the size of the beam spot impinging on said recording medium;

means for varying an intensity of the beam impinging on said recording medium;

a video signal generator for generating an intensity signal and an information signal;

means for driving said spot size control means, said spot size control means being responsive to said intensity signal to vary the diameter of the beam emergent from said spot size control means to form a beam for screen dot recording; and means for driving said beam intensity varying means, said beam intensity varying means being responsive to said intensity signal to vary the energy of said beam impinging on said recording medium to thereby effect simultaneous spot size control on the beam impinging on said recording medium.

24. An apparatus according to claim 23, wherein said spot size controlling means includes optical means for controlling the amount of aberration in the beam emergent therefrom to thereby vary the spot size.

25. An apparatus according to claim 24, wherein said optical means includes an element utilizing the electro-optic effect.

26. An apparatus according to claim 24, wherein said optical means includes an element utilizing the acousto-optic effect.

27. An apparatus according to claim 23, further comprising:

means for forming an electrostatic latent image on said recording medium in response to the incidence of the beam thereon; and means for developing said electrostatic latent image.

28. In an apparatus for effecting beam scanning and recording on a recording medium by using a substantially linear characteristic of density variation for exposure thereof, the improvement for recording half-tones of an image comprising:

means for causing a beam to scan over the recording medium; and means for controlling the size of the beam spot impinging on said recording medium including means for optically variating the beam diameter by aberration and means for defining an exposure time for the beam to scan over the recording medium, said means being effective to vary the exposure on the recording medium to thereby produce a density variation on the recording medium which represents half-tones of the image.

29. An apparatus according to claim 28, wherein said beam spot size controlling means includes optical means for controlling the amount of aberration in the beam to thereby vary the spot size.

* * * * *

UNITED STATES PATENT OFFICE
CERTIFICATE OF CORRECTION

Patent No. 4,198,154    Dated April 15, 1980

Inventor(s) KOICHI MASEGI, ET AL.

It is certified that error appears in the above-identified patent and that said Letters Patent are hereby corrected as shown below:

Column 2, line 60, "fist" should read --first--;

Column 5, line 30, "detector" should read --detection--;

Column 5, line 67, "12" should read --112--;

Column 8, line 5, " $e^{-\frac{r^2}{w_s^2} + \frac{K \cdot r^2}{2R}}$ " should read -- $e^{-\frac{r^2}{w_s^2} + i\frac{K \cdot r^2}{2R}}$ --;

Column 8, line 38, "803" should read --803'--;

UNITED STATES PATENT OFFICE
CERTIFICATE OF CORRECTION

Patent No. 4,198,154      Dated April 15, 1980

Inventor(s) KOICHI MASEGI, ET AL.

It is certified that error appears in the above-identified patent and that said Letters Patent are hereby corrected as shown below:

Column 8, line 54, "$\pi D/L^2 (8f/KA)^2 (1+K^2\pi^2 A^4) \cdot \log(2I_{tor}T)/\pi w_s^2 E_T$" should read --$\pi D/L^2 (8f/KA)^2 (1+K^2\sigma^2 A^4) \cdot \log(2I_{tot}T)/\pi w_s^2 E_T$--;

Column 10, line 44, "system 1033" should read --system 1035--.

Signed and Sealed this

Second Day of September 1980

[SEAL]

Attest:

SIDNEY A. DIAMOND

Attesting Officer     Commissioner of Patents and Trademarks